Patented Aug. 6, 1940

2,210,831

UNITED STATES PATENT OFFICE 2,210,831

AMINOMETHYLENE AMINO-1,3,5-TRIAZINES

Louis H. Bock, Glenside, and Alva L. Houk, Philadelphia, Pa., assignors to The Resinous Products & Chemical Company, Philadelphia, Pa.

No Drawing. Application October 21, 1939,
Serial No. 300,548

8 Claims. (Cl. 260—248)

This invention relates to aminomethylene amino-1,3,5-triazines and to a method for their preparation. More particularly it relates to non-aromatic aminomethyl derivatives of 1,3,5-triazines bearing at least one amino group.

In practicing this invention, reacting proportions of an amino-1,3,5-triazine, formaldehyde, and a non-aromatic, strongly basic amine carrying a reactive hydrogen atom on the nitrogen are mixed, in the presence of water or an inert organic solvent, the mixture stirred, and heat applied if desired, until the reaction is essentially complete. In some cases reaction starts even at room temperature but proceeds only slowly. Heating accelerates the reaction. The products formed from amines and triazines containing only small substituent groups are in general soluble in water. When an amine or triazine containing a large substituent group is a starting material, the reaction product will generally be insoluble in water. The products are, however, soluble in acid solutions and, in the case of compounds containing nuclear hydroxy groups, are also soluble in alkaline solutions.

The three reactants need not be mixed simultaneously. Amine and aldehyde may be mixed separately or intermediate reaction products of amine and formaldehyde may be made and then reacted with an aminotriazine. As a typical intermediate compound which reacts both as an amine and as formaldehyde, there may be mentioned tetramethyl methylene diamine. Also an aminotriazine may be mixed with an amine and formaldehyde gradually added.

The formaldehyde used in the reaction may be anhydrous, i. e. paraformaldehyde, or in the form of an aqueous or non-aqueous solution.

The amines which may be used must contain at least one reactive hydrogen attached to the nitrogen atom. The non-aromatic, secondary amines such as dimethylamine, diethylamine, diisobutylamine, diethanolamine, diallylamine, benzyl methylamine, dicyclohexylamine, morpholine, piperidine, piperazine, pyrrolidine, etc. are particularly useful. Primary amines, such as monoethanolamine, monomethylamine, monobutylamine, monocyclohexylamine, monobenzylamine, monoallylamine, etc., may also be used. One mol of amine for each mol of formaldehyde should usually be employed. In order to obtain a sufficient degree of basicity and of reactivity of the amine, it is preferred to use the amines which do not contain more than eight carbon atoms in a single group.

The amino-1,3,5-triazines which may be used include a wide variety of triazines carrying at least one amino group, such as ammeline, thioammeline, ammelide, and melamine. Aminotriazines bearing various substituents may also be employed. Representative of such aminotriazines are: 2-chloro-4,6-diamino-1,3,5-triazine, 1 - cyano - 2 - amino-4,6-dimethyl-1,3,5-triazine having the formula

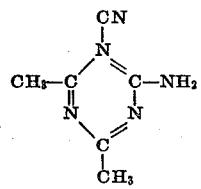

2-alkyl-4-amino-6-hydroxy-1,3,5 - triazines such as

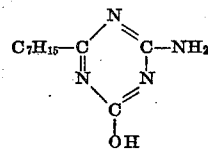

the aryl and alicyclic substituted triazines, and the substituted ammelines carrying acyl groups, such as dilauryl ammeline, having the formula

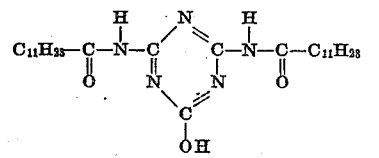

described in our copending application Serial No. 300,549, filed October 21, 1939.

When those substituted triazines or amines which form reaction products insoluble in water are used, the reaction may conveniently be carried out in such solvents as methyl, ethyl, butyl or other alcohol, dioxane, acetone, methyl ethyl ketone or other organic solvent.

The aminomethylene amino-1,3,5-triazines may be converted to their acid salts by the addition of acid or to quaternary ammonium salts by reacting with an agent for alkylation such as benzyl chloride, allyl bromide, ethyl sulfate or the like. The tertiary base, its acid salts, and also the quaternary salts react with cellulose to give a nitrogenous derivative of cellulose which is capable of reacting with acid dyes. By choosing a triazine which contains a hydrocarbon chain the cellulose may be rendered soft or, if a long hydrocarbon chain derivative is selected, water-resistant properties are obtained. Polyhydroxy sizing materials, such as starch, cellulose ethers, etc., may be rendered insoluble and rendered resistant to removal from mechanical treatment or washing. Rayon may be processed with the various aminomethyl-aminotriazines by treatment of fibers in the coagulating bath or in a bath following the coagulating bath. In any of these applications the material being treated need only be dried and heated to about 100° C. to obtain the full effect of the aminomethylene aminotriazines.

The derivatives containing an alicyclic group, an aliphatic hydrocarbon chain of more than four carbon atoms, or a long chained alkyl-substituted aryl group are surface active and have wetting, penetrating, emulsifying, and cleaning actions, which are of particular value in acid solutions. These products may also serve as insecticides, germicides, de-emulsifying agents for petroleum and other oils, flotation agents, etc.

The following examples describe the preparation of the dialkyl aminomethyl derivatives:

EXAMPLE 1

*Tris-(dimethyl aminomethyl) melamine hydrochloride*

A mixture consisting of 25 parts of melamine, 60 parts of a 30% aqueous solution of formaldehyde and 115 parts of a 25% aqueous solution of dimethyl amine was stirred for one hour at 65–70° C. Hydrochloric acid was then added till the solution was neutral to litmus. The solution on vacuum drying yielded 77 parts of a thick syrup which on analysis showed 26.8% nitrogen.

EXAMPLE 2

*Di-(dimethylaminomethyl) thioammeline*

A mixture consisting of 71 parts of thioammeline, 100 parts of water, 100 parts of a 30% aqueous solution of formaldehyde and 190 parts of a 25% aqueous solution of dimethylamine was stirred one hour at 70–80° C. The solution on concentration in vacuum yielded 110 parts of a crystalline solid, which showed on analysis 36.95% nitrogen.

EXAMPLE 3

*Piperidinomethyl derivative of methyl ether of thioammeline*

A mixture consisting of 16 parts of methyl ether of thioammeline, 18 parts of piperidine and 40 parts of a 30% aqueous solution of formaldehyde was stirred for three hours at 70° C. The solution was evaporated under vacuum leaving a brittle solid, which was insoluble in water but soluble in dilute acids.

EXAMPLE 4

*2 - heptyl - 4 -dimethylaminomethylamino-6-hydroxy-1,3,5-triazine*

A mixture consisting of 20 parts of 2-heptyl-4-amino-6-hydroxy-1,3,5-triazine, 100 parts of dry benzene, 2.8 parts of paraformaldehyde and 9.5 parts of tetramethyl methylene diamine was refluxed with stirring for two hours. The solvent was evaporated in vacuum and a dry solid obtained. It is soluble in either dilute acid or dilute alkali.

EXAMPLE 5

*Dimethylaminomethyl derivative of distearyl ammeline*

A mixture consisting of 105 parts of distearyl ammeline, 13.5 parts of paraformaldehyde, 46 parts of tetramethyl methylene diamine and 200 parts of petroleum ether B. P. 60–90° C. was stirred two hours at reflux. The resulting solution was evaporated in vacuum to dryness. The solid thus obtained was soap-like in its properties.

EXAMPLE 6

*Morpholinomethyl diacetyl ammeline*

To a solution containing 30 parts of a 30% solution of formaldehyde, 25 parts of morpholine and 55 parts of water there was added 21.1 parts of diacetyl ammeline. The mixture was stirred three hours at 70–75° C. The resulting solution was evaporated in vacuum to dryness, yielding 31 parts of a solid which showed 35.9% nitrogen on analysis.

EXAMPLE 7

*Dimethylaminomethyl derivative of 1-cyano-6-imino-2,4-dimethyl hexahydro-1,3,5-triazine*

To 23 parts of 1-cyano-6-imino-2,4-dimethyl hexahydro triazine was added 4.5 parts of paraformaldehyde and 16 parts of tetramethyl methylene diamine. The mixture was stirred three hours at 70° C. with two additions of 25 ml. each of toluene. The product was filtered and washed with toluene and on analysis showed 34.18% nitrogen.

EXAMPLE 8

*Dimethylaminomethyl ammelide*

To 256 parts of ammelide (containing 15% ammeline) was added 440 parts of 30% formaldehyde and 850 parts of 25% dimethylamine. After the mixture was stirred for three hours at 70° C., it was heated under vacuum until a solid was formed, constituting 220 parts and having by analysis a nitrogen content of 31.5%.

From the general disclosure which has been made and from the examples given it is evident that wide variations in the nature and choice of reacting conditions are possible and that a wide variety of reactants may be used. The reaction is conducted under neutral or alkaline conditions. Small amounts of alkalies, such as sodium hydroxide or sodium carbonate, may be used in some cases as catalysts. The products obtained vary from liquids to solids. Some of these are oil-soluble and may be used in solvents for the purposes already related. Many of the compounds, on the other hand, give solutions in water. The products are useful in the form in which obtained, but may be purified when so desired. They may also be used in the form of their salts.

In general, equimolar ratios of formaldehyde and the amine are used and at least one mol of each is used for each mol of an aminotriazine. With some triazines it is possible to react one, two, three or four molecular proportions each of formaldehyde and an amine having at least one reactive hydrogen attached to the nitrogen, such as dimethylamine or monomethylamine. In extreme cases it is possible to react six or eight mols each of formaldehyde and the amine with an amino-1,3,5-triazine possessing a like number of reactive positions. An excess of formaldehyde may be used in some cases with the formation of mixed methylol derivatives and methylol amines (from primary amines) which lead to resin formation.

We claim:

1. A condensation product of an amino-1,3,5-triazine and at least one mol each of formaldehyde and a strongly basic, non-aromatic amine having less than nine carbon atoms in any single group attached to the nitrogen and having at least one reactive hydrogen attached to the nitrogen.

2. A condensation product of an amino-1,3,5-triazine and at least one mol each of formaldehyde and a strongly basic, non-aromatic secondary amine having less than nine carbon atoms in each nitrogen substituent.

3. A condensation product of an amino-1,3,5-triazine and at least one molecular proportion each of formaldehyde and dimethylamine.

4. A condensation product of melamine and at least one molecular proportion each of formaldehyde and dimethylamine.

5. A process for preparing aminomethylene amino-1,3,5-triazines which comprises reacting an amino-1,3,5-triazine with at least one molecular proportion each of formaldehyde and a strongly basic, non-aromatic amine having less than nine carbon atoms in any single group attached to the nitrogen and having at least one reactive hydrogen attached to the nitrogen.

6. A process for preparing aminomethylene amino-1,3,5-triazines which comprises reacting an amino-1,3,5-triazine with at least one molecular proportion each of formaldehyde and a strongly basic, non-aromatic secondary amine having less than nine carbon atoms in either nitrogen substituent.

7. A process for preparing dimethylaminomethylene amino-1,3,5-triazine which comprises reacting an amino-1,3,5-triazine with at least one molecular proportion each of formaldehyde and dimethylamine.

8. A process of preparing a dimethylaminomethylene derivative of melamine which comprises reacting one molecular proportion of melamine with at least one molecular proportion each of formaldehyde and dimethylamine.

LOUIS H. BOCK.
ALVA L. HOUK.